United States Patent [19]
Aitken

[11] 3,930,877
[45] Jan. 6, 1976

[54] CATIONIC STARCH AND CONDENSATES FOR MAKING THE SAME

[75] Inventor: Thomas Aitken, Chicago, Ill.

[73] Assignee: Nalco Chemical Company, Oak Brook, Ill.

[22] Filed: Aug. 21, 1974

[21] Appl. No.: 499,283

Related U.S. Application Data

[62] Division of Ser. No. 387,828, Aug. 13, 1973, Pat. No. 3,854,970.

[52] U.S. Cl. .............................. 106/287; 106/273
[51] Int. Cl.² .......................................... C08L 3/02
[58] Field of Search.......... 106/287 R; 260/584, 585

[56] References Cited
UNITED STATES PATENTS

| | | | |
|---|---|---|---|
| 2,520,093 | 8/1950 | Gross | 260/584 R |
| 3,441,609 | 4/1969 | McKelvey | 260/584 |

*Primary Examiner*—Theodore Morris
*Attorney, Agent, or Firm*—John G. Premo; John S. Roberts

[57] ABSTRACT

A cationic additive for starch which comprises a preferred condensate of epichlorohydrin with an equimolar quantity with dimethylamine, and in which a minor amount of up to 30 percent molar ammonia may be substituted for a like molar amount of dimethylamine. This condensate is preferably intimately admixed and utilized in an amount of 1–7 percent (preferred 5–7 percent) with alkaline gelatinized or alkali hydrolyzed starch to give a liquid cationic treating agent for paper. The percentage of condensate additive is calculated using as a base granular or dry starch and the condensate is preferably added to the liquid gelatinous starch after the gelatinization or in situ during the gelatinization. The starch, during the addition of the condensate, is maintained alkaline by a preferred alkali metal hydroxide of about 5 percent strength. This cationic starch may be used as a wet end pulp additive in the range 3–50 lbs/ton and has shown to favorably affect burst strength and pigment retention values.

5 Claims, No Drawings

CATIONIC STARCH AND CONDENSATES FOR MAKING THE SAME

This is a division of application Ser. No. 387,828, filed Aug. 13, 1973, now U.S. Pat. No. 3,854,970.

The present invention relates to an improved condensate of the epihalohydrin-amine type useful when mixed with alkaline starch either during or after gelatinization. The present starch condensate products which are liquid may be utilized as "wet-end" additives to the aqueous slurry in a paper-making process with consequent favorable effect on burst strength and cellulose and pigment retention. It has been theorized that the cationic alteration of the starch molecule strengthens the bond with the negative cellulose in the paper slurry by a mechanism which probably introduces a quaternary nitrogen group through an ether linkage on the primary hydroxyl group of the starch molecule. The degree of substitution (D.S.) is a measurement of alteration of the starch molecule and for cationic starch a value of 0.4 – 0.5 D.S. has been found to be optimum. A key advantage of cationic starches containing quaternary nitrogen groups is that they are operable on paper over a wider pH range than unmodified starch, e.g., 4–10 pH. See "Papermaking and Paperboard Making" II, Vol. III (1970), p. 65, McGraw-Hill Book Company.

PRIOR PATENTED ART

U.S. Pat. No. 2,813,093 — Caldwell et al. (National Starch) — 1957

Granular starch plus a tertiary amine hydrochloride (e.g., b-diethyl aminoethyl chloride).

U.S. Pat. No. 2,876,217 — Paschall (Corn Products) — 1959

Granular starch ethers produced by reaction of a tertiary amine (e.g., trimethyl amine) with epichlorohydrin (epi) and suppressing cross-linking by vacuum or solvent elimination of excess epi.

U.S. Pat. No. 2,995,513 — Paschall et al. (Corn Products) — 1961

Gelatinized starch ethers produced by epichlorohydrin plus a tertiary amine or a quaternary amine salt (e.g., trimethyl-amine hydrochloride). The degree of substitution was D.S. = 0.3 to 0.5.

Canadian Pat. No. 715,566 — Paschall et al. (Corn Products) — 1965

Granular or ungelatinized starch ether prepared from an epi-tertiary amine condensate where the tertiary amine contains two or three methyl groups and is condensed equimolar with epichlorohydrin; also, there is a provision to remove unreacted epi by vacuum or solvent extraction, thus preventing cross-linking by unreacted epi.

Australian Pat. No. 404,812 — Brown (Australian Paper Manufactures Limited) — 1969

Gelatinized starch reacted in situ with an epichlorohydrin-ammonia condensation product.

U.S. Pat. No. 3,666,751 — Jarowenko et al. (National Starch) — 1972

Liquid starch products similar to Brown above prepared by reacting starch with epichlorohydrin-ammonium hydroxide condensates.

U.S. Pat. No. 3,674,725 — Aitken et al. (Nalco) — 1972

Method of cationization of starch which comprises reacting starch under alkaline conditions with a polymer formed from polyepichlorohydrin and an amine (e.g., trimethylamine, dimethylamine, etc.).

U.S. Pat. No. 3,738,945 to Panzer et al. utilizes reaction products of epichlorohydrin and secondary amines.

The present invention differs from the prior art in that it is designed for a liquid cationic starch and is either a binary condensate of epichlorohydrin (epi) and dimethylamine (DMA) or is a modified ternary condensate wherein a minor amount of up to 30 percent molar amount of ammonia is substituted for a like amount of dimethylamine. In contrast, U.S. Pat. No. 3,666,751 above is a binary condensate of epi and ammonium hydroxide and the closest teaching to this invention is believed to be Column 4, lines 35–37, which indicates a possible inclusion of up to 15 percent of a cross-linking inhibitor specifying ethylamine and diethylamine. One of the present inventor's prior patent U.S. Pat. No. 3,674,725, Aitken above, produces a cationic starch additive from related starting materials but uses polyepichlorohydrin instead of the present epi.

PREPARATION OF THE CONDENSATE

The epichlorohydrin-DMA condensate which is used to react with the starch is prepared by admixing epichlorohydrin (epi) with dimethylamine in approximately equimolar proportions utilizing reaction condensate conditions of temperatures about 60°–80° C. for 1 hour under alkaline pH conditions, as for example using 5 percent NaCH or a preferred range of 5–8 percent alkali metal hydroxide. The product is subsequently acidified with a mineral acid such as HCl to a pH of about 3.0, thus producing an amine salt or a quaternary ammonium anion site on the nitrogen of the DMA moiety. The basic condensate is a one-to-one reaction of epi wherein the epoxy ring is attacked or opened by DMA or ammonia to form the basic condensate which may further condense in irregular linear fashion.

With reference to the term epichlorohydrin, it is understood for purposes of this invention that the brom analog, epibromhydrin, may be utilized in place of the preferred epichlorohydrin. The variation of reaction conditions to produce the ternary compositions of the present invention, i.e., epichlorohydrin-DMA-ammonia, may be achieved by adding to the mix up to 30 percent molar of ammonium hydroxide utilized as concentrated ammonium hydroxide (26° Be). The ternary compositions embodying 10 percent ammonia and 20 percent ammonia are preferred in this invention, and the efficacy of these compositions is believed due to the high proportion of quaternary ammonium groups which is effective for starch cationization at higher pH levels than a composition derived entirely from ammonia and epichlorohydrin. The present condensates thus show particular advantages over starches modified with tertiary amines or tertiary amine polymers.

The proportions of epichlorohydrin and DMA which are used at a preferred ratio may vary within the range of about 0.8 to 3 mols of epichlorohydrin to 1 mol of DMA. Condensates utilizing greater than 3 mols of epichlorohydrin are unsatisfactory in that they tend to cross-link the starch. On the other hand, condensates using less than 0.8 mols of epichlorohydrin per mol of DMA lack sufficient reactive sites. Where utilized herein broadly the term "condensate" refers to both the binary epi-DMA and the ternary epi-DMA-NH$_3$ condensates described and claimed herein.

THE LIQUID CATIONIC STARCH

The condensates, either binary or ternary, of the present invention find utility as liquid cationic starch products and are added to gelatinous starch which has been hydrolyzed, usually by alkaline cooking from granular or dry starch. The preferred modus of the present invention is to alkalinize the starch prior to its conversion to a gelatin form and after the gelatinization is completed to add the epi-DMA or epi-DMA-NH$_3$ condensate.

Calculated from the dry starch basis, the epi-DMA and epi-DMA-NH$_3$ condensate additives are utilized in amounts of about 1 to 7 percent and preferably 5 to 7 percent to the gelatinous starch either so-called in situ during the gelatinization of the starch or preferably afterwards. These additives are utilized in alkaline conditions, usually with added alkaline treating agents such as sodium hydroxide, slaked lime which is CaOH$_2$, and other strong alkalis such as barium hydroxide, in amounts to give the reaction medium a pH of at least 11. For the preferred alkali metal hydroxide, such as NaOH, 5–8 percent NaOH or starch weight is applied. If the cationic reaction of the starch is made subsequent to the gelatinization of the starch, i.e., the epi-DMA condensate is added to the gelatinized starch, the reaction conditions utilized are at temperatures of 30° – 100° C. for a period of 5 minutes to 24 hours until the reaction is complete. In the mix may be included substances useful to preserve starch against microbial attack such as formaldehyde, phenols, etc.

The products of the invention are liquid starches as opposed to dried granular or solid starches, and reactant starch may be selected from a number of starch types which have been hydrolyzed or gelatinized. Such starches may be derived from many sources including corn, wheat, potato, tapioca, waxy maize, sago, rice, etc. Generally, a preferred starch according to the invention is an amylaceous substance containing free hydroxyl groups.

USE IN PAPER MAKING PROCESS

The present liquid cationic additives are designed for addition to the wet end of a paper-making process. In the conventional process, this may be any point from the head box on back. In practice, they may be introduced into the beater, hydro-pulper, stock chest, or head box, or in any point prior to the conversion of the wet pulp into a dry web or sheet, which is prior to passing the stock onto the drying stage.

Dependent upon the type of paper produced, the additive may be introduced in amounts as low as 3 pounds per ton for low grade paper, and up to 50 lbs. per ton for offset grade paper. The consequent advantages of utilization lie in cellulose retention, pigment retention, and increase in burst strength and other physical properties of the finished paper.

The following examples will further illustrate the embodiments of the invention:

EXAMPLE 1

Preparation of Exemplary Condensates Epi-DMA-NH$_3$

In a pilot plant set up embodying a 2000-gallon batch size reactor, a 250-gallon weight tank, and an optional recycle loop with an in-line viscometer and recorder, the following materials were utilized in weight per cent and pounds noted:

| Raw Materials | | |
| --- | --- | --- |
| Soft Water | 37.459 | 7130 |
| 60% Dimethylamine Solution | 22.773 | 4334 |
| Epichlorohydrin | 34.315 | 6531 |
| Aqua Ammonia 26° Be (Spec. Grav. 0.895 – 0.900 at 20° C.) | 2.046 | 389 |
| 50% Caustic | 1.981 | 377 |
| 37% Hydrochloric Acid | 1.426 | 271 |
| | 100.000 | 19032 |

After preliminary cleaning of the reactor and leak testing, 7,130 pounds or 855 gallons of soft water were added to the reactor and then the reactor was charged with 389 pounds of ammonia, using reactor vacuum to suck material from the drum. Then 4,334 pounds of 60 percent dimethyl amine (DMA) solution was added to the reactor. Epichlorohydrin was added at about 20 pounds per minute to the full amount of 6,531 pounds.

The temperature was monitored to about 80° C. (176° F.) and while the epi was being added (about 6 hours). At the end of the epi addition, the temperature was held at 80° C. for about half an hour and then 377 pounds of 50 percent NaOH was added and pH and viscosity checks were made at half hour to 1 hour intervals.

When condensate reaction was complete to 600–700 cps as measured by viscosity determination, the HCl 37 percent was added to acidify to a pH of 3.0 and the product was cooled. The product produced was a condensate from 90 percent DMA - 10 percent NH$_3$ - epichlorohydrin.

The product produced was a condensate denoted B from 90% DNA, 10% NH$_3$ epichlorohydrin (equimolar). Additional runs using this procedure produced the following additional condensates set out below:

A. 100% dimethylamine, 0% NH$_3$, epichlorohydrin
B. See above.
C. 80% dimethylamine, 20% NH$_3$, epichlorohydrin
D. 70% dimethylamine, 30% NH$_3$, epichlorohydrin The above percentages are on a molar basis.

EXAMPLE 2

APPLICATION TO STARCH AND BURST TEST COMPARISON

In the following examples, Corn Products Co. Globe No. 3001 corn starch was utilized for starch modification. A group of starch samples was slurried at 4 percent concentration, treated with 5 percent NaOH and 5 percent active condensate based upon the starch dry weight. The mixture was heated rapidly at 200° F. (93° C.) with stirring, and cooked for 30 minutes to gelatinize before quenching and evaluating.

In the paper making sub-examples, the starch application to the paper-making system was added to the wet end in an amount of 10 pounds per ton at a pH of 5.5.

With reference to the condensates A through D prepared in Example 1, the following shows burst strength values as improvement over a blank for the same condensates applied to starch and then to a paper slurry under the conditions noted above:

| | Burst Strength |
|---|---|
| Condensate A | 7.3 |
| Condensate B | 22.2 |
| Condensate C | 20.2 |
| Condensate D | 15.0 |

The burst strength tests were made according to T403m53 entitled "Bursting Strength of Paper," TAPPI, as corrected August 1953.

EXAMPLE 3
ALKALI APPLICATION

Using selected condensates a comparison of variation of strength of alkali treatment of the starch was made in measurement of burst strength: Alkali Application (starch preparations as in Example 2 above, using 5 percent Condensate C)

| | Burst Strength |
|---|---|
| 2% NaOH applied on starch weight | 13.0 |
| 3% NaOH applied on starch weight | 15.7 |
| 4% NaOH applied on starch weight | 16.8 |
| 5% NaOH applied on starch weight | 20.2 |
| 6.5% NaOH applied on starch weight | 20.0 |
| 8% NaOH applied on starch weight | 20.1 |

Use of Slaked Lime Instead of Caustic (using 5% Condensate B):

| | Burst Strength |
|---|---|
| 3.2 Ca(OH)$_2$ on starch weight | 16.1 |
| 3.7% Ca(OH)$_2$ on starch weight | 18.1 |
| 4.3% Ca(OH)$_2$ on starch weight | 21.0 |

EXAMPLE 4
Application of the Condensate After Gelatinizing the Starch (Condensate B)

| | Burst Strength |
|---|---|
| Control (Ca(OH)$_2$ and condensate added before cooking starch) | 21.0 |
| Condensate added after gelatinizing the starch | 22.2 |

EXAMPLE 5

In the following experimental procedures, starches derived from several different sources were utilized and subjected to the TAPPI burst test cited above:

| | Burst Strength |
|---|---|
| Corn (Globe No. 3001) 5% NaOH, 5% Condensate B | 20.2 |
| Tapioca, 5% NaOH, 5% Condensate B | 21.7 |
| Potato, 5% NaOH, 5% Condensate B | 17.6 |
| Potato, 5% NaOH, 5% Condensate B | 20.5 |

EXAMPLE 6
Comparison with Commercial Cationic Starch Internal Bond and Burst Strength By utilizing further experimental procedures and testing by TAPPI test T506su-68, internal bond test, the following comparisons were made:

| | Internal Bond (TMI) |
|---|---|
| Untreated paper | 29.8 |
| 10 lbs. corn starch modified with 5% NaOH and 5% Condensate B in wet end addition | 42.1 |
| 10 lbs. CATO 15 (National Starch) | 42.5 |

| | Burst Strength Improvement |
|---|---|
| 4.2% Ca(OH)$_2$, 5% Condensate B | 22.2 |
| CATO 15 (National Starch) | 19.6 |

The embodiments of this invention in which an exclusive property or privilege is claimed are defined as follows:

1. An additive to produce cationic starch which consists of a condensate of epichlorohydrin with an equimolar amount of dimethylamine modified by at least a minor amount up to 30 percent molar amount of ammonia based on the dimethylamine and substituted therefor.

2. The starch additive according to claim 1, wherein the additive consists of a condensate of epichlorohydrin with an equimolar amount of dimethylamine.

3. The starch additive according to claim 1, wherein the dimethylamine is modified by about 10 percent molar ammonia substituted therefor.

4. The starch additive according to claim 1, wherein the dimethylamine is modified by about 20 percent molar ammonia substituted therefor.

5. The starch additive according to claim 1, wherein the dimethylamine is modified by about 30 percent molar ammonia substituted therefor.

* * * * *